United States Patent
Novoa et al.

(10) Patent No.: US 6,636,973 B1
(45) Date of Patent: Oct. 21, 2003

(54) SECURE AND DYNAMIC BIOMETRICS-BASED TOKEN GENERATION FOR ACCESS CONTROL AND AUTHENTICATION

(75) Inventors: Manuel Novoa, Houston, TX (US); Adrian Crisan, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/149,400
(22) Filed: Sep. 8, 1998
(51) Int. Cl.⁷ .............................................. H04L 9/32
(52) U.S. Cl. ................... 713/202; 340/5.74; 340/5.82
(58) Field of Search ............................... 713/200–202, 713/182–186; 340/5.52–5.54, 5.74, 5.8–5.85; 382/115–119, 124

(56) References Cited

U.S. PATENT DOCUMENTS

| | | | |
|---|---|---|---|
| 4,983,415 A | | 1/1991 | Arndt et al. |
| 5,280,527 A | * | 1/1994 | Gullman et al. ............ 713/184 |
| 5,361,062 A | | 11/1994 | Weiss et al. |
| 5,485,519 A | | 1/1996 | Weiss |
| 5,604,803 A | * | 2/1997 | Aziz ........................... 713/155 |
| 5,657,388 A | | 8/1997 | Weiss |
| 5,661,807 A | * | 8/1997 | Guski et al. ................. 713/159 |
| 5,708,777 A | * | 1/1998 | Sloan et al. ................. 713/202 |
| 5,732,138 A | * | 3/1998 | Noll et al. ..................... 380/28 |
| 5,737,071 A | | 4/1998 | Arndt |
| 5,751,950 A | | 5/1998 | Crisan ......................... 395/188 |
| 5,930,804 A | * | 7/1999 | Yu et al. ...................... 707/104 |
| 5,944,824 A | * | 8/1999 | He .............................. 713/201 |
| 5,949,882 A | * | 9/1999 | Angelo ........................ 713/202 |
| 5,987,153 A | * | 11/1999 | Chan et al. .................. 382/115 |
| 6,000,033 A | * | 12/1999 | Kelley et al. ............... 713/201 |
| 6,035,406 A | * | 3/2000 | Moussa et al. .............. 713/202 |
| 6,421,453 B1 | * | 7/2002 | Kanevsky et al. .......... 382/115 |

OTHER PUBLICATIONS

O'Shea et al, "BioNetrix Suite Covers All the Bases" Dec. 27, 1999, Network Computing, Dialog Text Search, p. 1–7.*
Lapere, ASPeCT Deliverable D24: Vocal Password–Based User Authentication Report, Sep. 3, 1998, p. 1–20.*

* cited by examiner

*Primary Examiner*—Gail Hayes
*Assistant Examiner*—Christopher Revak

(57) ABSTRACT

A computer network includes at least one client computer coupled to a server computer that dynamically changes a user's password each time the user logs on to the computer network. By changing the password during the log on process, network security is increased. The server computer includes a users databases that contains a password, a username (if desired) and a biometrics template value associated with each user registered to access the computer network. A biometrics sensing device, such as a fingerprint sensor, is connected to each client computer. The user attempts to log on the server by entering a username which is optional and activating the biometrics sensing device. Appropriate software and/or hardware in the client and server computers capture a sample from the biometrics sensing device and create a template value from the captured sample. The template value thus is representative of a bodily characteristic of the user who activated the biometrics sensing device in an attempt to log on to the server computer. The client computer then transmits the template value to the server which compares the template value received from the client computer with template values previously stored in the users database. If a match is found, the log on process completes. At some point during or after the log on process, the biometrics account manager changes the current password associated with the user to a new password and overwrites the previous password with the new password.

10 Claims, 4 Drawing Sheets

SECURE AND DYNAMIC BIOMETRICS-BASED TOKEN GENERATION FOR ACCESS CONTROL AND AUTHENTICATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to improved security in a computer network. More particularly, the invention relates to improved security during the log on process. More particularly still, the invention relates to dynamically altering a user's password during the log on process.

2. Background of the Invention

Computer networks usually comprise one or more "client" computers coupled to one or more "file servers." A user accesses the information and capabilities of the network through a client computer. The file server (or simply "server") generally is a central control point that provides the user access to the network's resources. Access to the network typically requires a user to "log on" to the network. The log on process normally involves the user entering a username and password through a keyboard attached to a client computer. The username and password are then transmitted to the file server where they are compared to a user database that contains a username and password for all users that have been registered by a system administrator to access the network. If match is found, the server logs the user on to the network and the user can access whatever network resources the system administrator has designated for that user.

Although the username and password are unique for each registered user, anyone can access the computer network if he or she knows a registered username and password. Conventional computer networks do not have the ability to determine whether the user that has entered the username and password actually is the person authorized to use that username and password. To prevent unauthorized access to a computer network's resources, it is important in such a conventional computer network for each user to keep his or her username and password secret. The security of a computer network is compromised, however, if a user fails to adequately keep his or her password and usemarne secret. Thus, improved techniques to minimize unauthorized computer network access which minimize or avoid reliance on the reliability of a human user to maintain username/password secrecy are desirable.

One approach to improving security in a computer network environment involves the use of a "biometric" during the log on process. As used throughout this disclosure, the term "biometric" generally refers to any bodily parameter unique to each user. Examples of biometrics include fingerprints, hand geometry, facial geometry, retinal scan, voice, body odor or any other characteristic that distinguishes one person from another. Biometrics can be detected, measured, and/or scanned by a suitable device. For example, Identicator Technologies, Corp. has introduced a fingerprint sensor device that connects to a computer system. A user places his or her finger on the surface of the device and an image is captured of the user's fingerprint. That fingerprint image is provided to the computer system. The computer processes the fingerprint image and generates a "template" of the image which is a value representative of the raw image.

When a user is first enrolled as a registered user, an image is captured of the user's fingerprint, a template is generated therefrom, and a password and username are assigned to the user. The password and template are stored in a database and indexed by username. The database thus contains passwords and fingerprint templates for all users wishing to log on using the fingerprint identification mechanism. During the log on process, the computer network compares the template generated to templates previously stored in the database. If a match is found, the computer selects the password that is stored with the matching fingerprint template and uses the username and password to log the user on the network.

In this scheme in addition to permitting the user to log on to the computer network by typing a username and password, the fingerprint sensor permits a user to log on by entering a username and fingerprint. Thus, the user of such a computer system can log on to the network either using the biometric feature or entering a username and password in accordance with conventional log on procedure.

Even in computer network systems that incorporate biometric log on devices, security is still an issue. Passwords associated with each user still are required for the file server to log the user into the network. Most computer systems that incorporate fingerprint identification also permit logging on using the conventional username/password data entry method. Thus, an unauthorized person who is able to obtain a valid password can still log on to the computer network without a biometric. Passwords typically remain static and are only changed, if at all, after predefined periods of time to increase network security. When it is time to change a password, the user is prompted to type in a new password to replace the old password. The potential for a user not keeping the password secret still exists even in systems which encourage a periodic password change.

Thus, it is desirable to provide a computer network system which provides increased security relative to conventional computer systems. Improved security is also desirable in a stand-alone computer to prevent unauthorized access to the resources available in that computer. Despite the advantages such a computer system would offer, to date no such system is known to exist.

BRIEF SUMMARY OF THE INVENTION

The deficiencies of the prior art described above are solved in large part by a computer network including at least one client computer coupled to a server computer that dynamically changes a user's password preferably each time the user successfully logs on to the computer network. The server computer includes a users database that contains a password, a username (optional) and a biometrics template value associated with each user registered to access the computer network. A biometrics sensing device, such as a fingerprint sensor, connects to each client computer. The user attempts to log on to the server by entering a username (which is optional) and activating the biometrics sensing device to capture a sample of a bodily characteristic of the user. If the biometrics sensing device is a fingerprint sensor, for example, the user places a finger in contact with the sensor. Appropriate software and/or hardware in the client and server computers capture an image of the user's fingerprint from the biometrics sensing device and create a template value from the captured image. The template value thus is representative of a bodily characteristic of the user who activated the biometrics sensing device in an attempt to log on to the server computer.

The client then transmits the template value to the server that includes a fingerprint matching library and a users database. The matching library compares the template value received from the client computer with template values previously stored in the users database. If a match if found, indicating that the user who is attempting to log on is a registered user, the log on process completes. A "match" does not necessarily require an identical value, but also includes values within a predefined range as determined using a suitable scoring mechanism. At some point during or after the log on process, a biometrics account manager which has access to the users database changes the current password associated with the use to a new password. Thus, each time a user logs on to the computer network the password is changed, thereby increasing security in the computer network. Because the user is not required to remember and type the password, the passwords may be longer and more complex, thereby further enhancing security. In general, the passwords can be as long as is allowed by the operating system.

The process of changing the password preferably includes using the current password (i.e., the password about to be changed) or the user's template value generated during log on as a seed value to generate a random alphanumeric string. The random alphanumeric string becomes that user's new password. Further, in one embodiment, the newly generated password is generated and used to log on the user. In an alternative embodiment, the current password is used to log on the user and the newly generated password is used the next time the user attempts to log in.

By dynamically changing a user's password each time the user logs on to the computer network, the security issues described above regarding conventional computer systems are mitigated or avoided altogether. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

A better understanding of the present invention can be obtained when the following detailed description of the preferred embodiments is considered in conjunction with the following s, in which:

FIG. 2A is an enlarged representation of the user's database included in the computer network of FIG. 1;

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
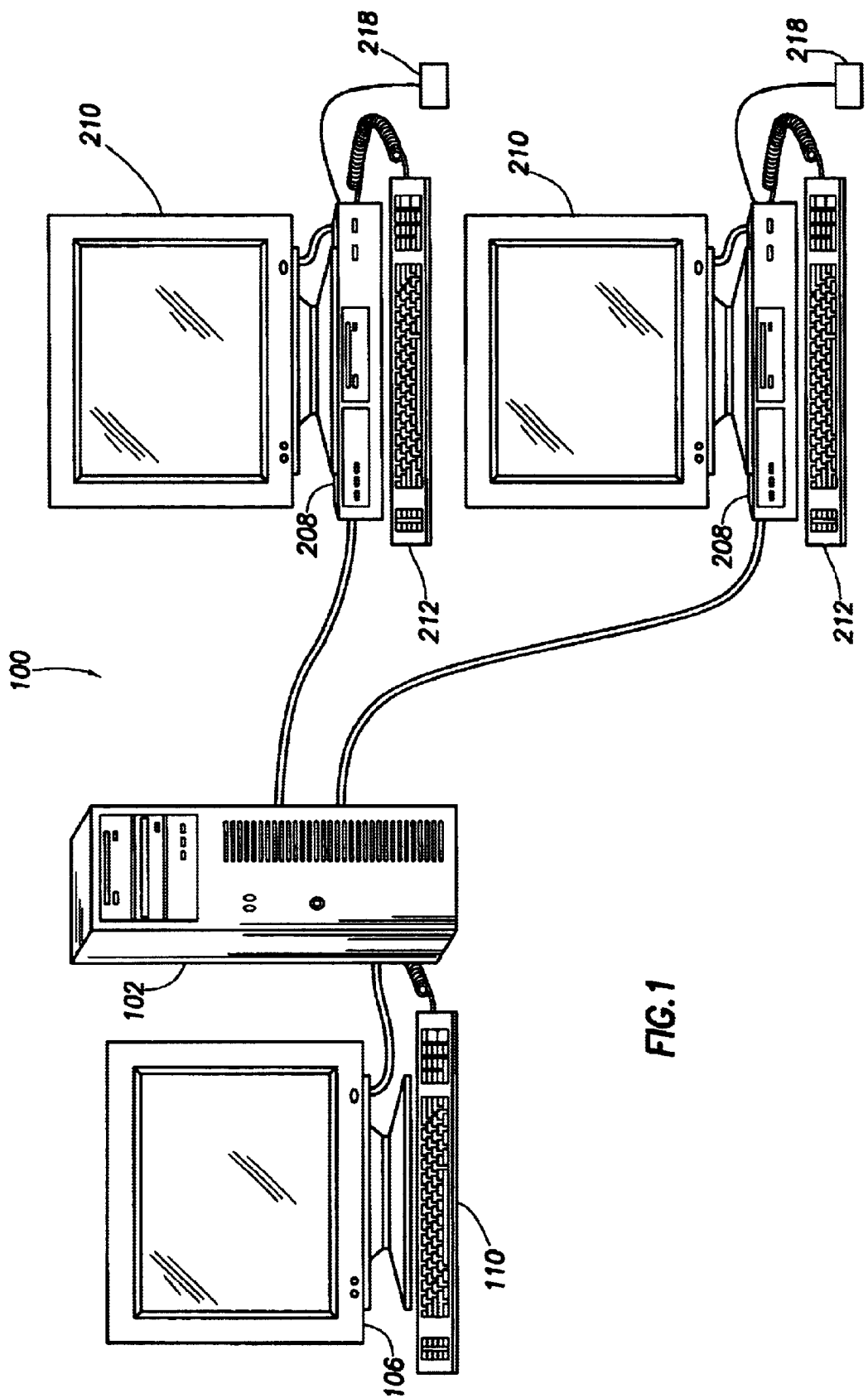
FIG. 1 is a computer network including a file server and multiple client computers each provided with a biometric sensing device.

Referring now to FIG. 1, a computer network 100 constructed in accordance with the preferred embodiment generally includes a file server 102 coupled to one or more client computers (referred to hereafter as "clients") 208. The server 102 includes a display 106 and keyboard 110. Similarly, each client computer 208 includes a display 210 and keyboard 212. In the exemplary drawing of FIG. 1, two clients are shown, but any number of clients can be incorporated into computer network 100. Further, network 100 can be implemented with more than one server if desired. Additionally, the principles of the invention described below with respect to a computer network are equally applicable with respect to a stand alone, unnetworked computer. Moreover, the principles described herein are applicable in any environment in which a person logs on or in some way accesses an electronic device such as a stand alone computer, computer network, and automatic teller machine for which security is desirable.

The server 102 preferably is any suitable type of computer such as a Proliant manufactured by Compaq Computer Corporation. The clients are any suitable computer such as a Desk pro also manufactured by Compaq Computer Corporation.

Referring still to FIG. 1, a user accesses the computer network 100 by logging on to the server 102 through a client 208. Each client preferably has a biometric sensing device 218 connected to the client. The biometric sensing device 218 preferably senses, detects, measures, samples, or in some way responds to a bodily characteristic unique to each user. Examples of unique bodily characteristics include fingerprints, face or hand geometry, voice, retinal scan, or any other characteristic that can distinguish one user from another. The biometric sensing device 218 responds to a particular bodily characteristic and provides a signal or image representative of that user's characteristic to the associated client 208. For sake of clarity, the term "biometric sample" will be used to denote a signal, value, or image generated by the biometric sensing device 218 in response to a bodily characteristic of the user. In accordance with a preferred embodiment of the invention, biometric sensing device 218 includes a fingerprint sensing device such as that available from Identicator Technologies Corp.

During the log on process for network 100, a user is prompted to type his or her 'username' into the keyboard provided with the client. This step, however, is optional. Then, the user is prompted to place a finger on the fingerprint sensing device 218. The server 102 receives a signal representative of the user's fingerprint image and, as explained in detail below, if that representative signal matches one of the fingerprints stored in a users database (shown in FIG. 2), the user is provided access to the network 100 (i.e., the user is "logged on"). If there is no match, the user is not logged on to the network 100.

Figure 2:
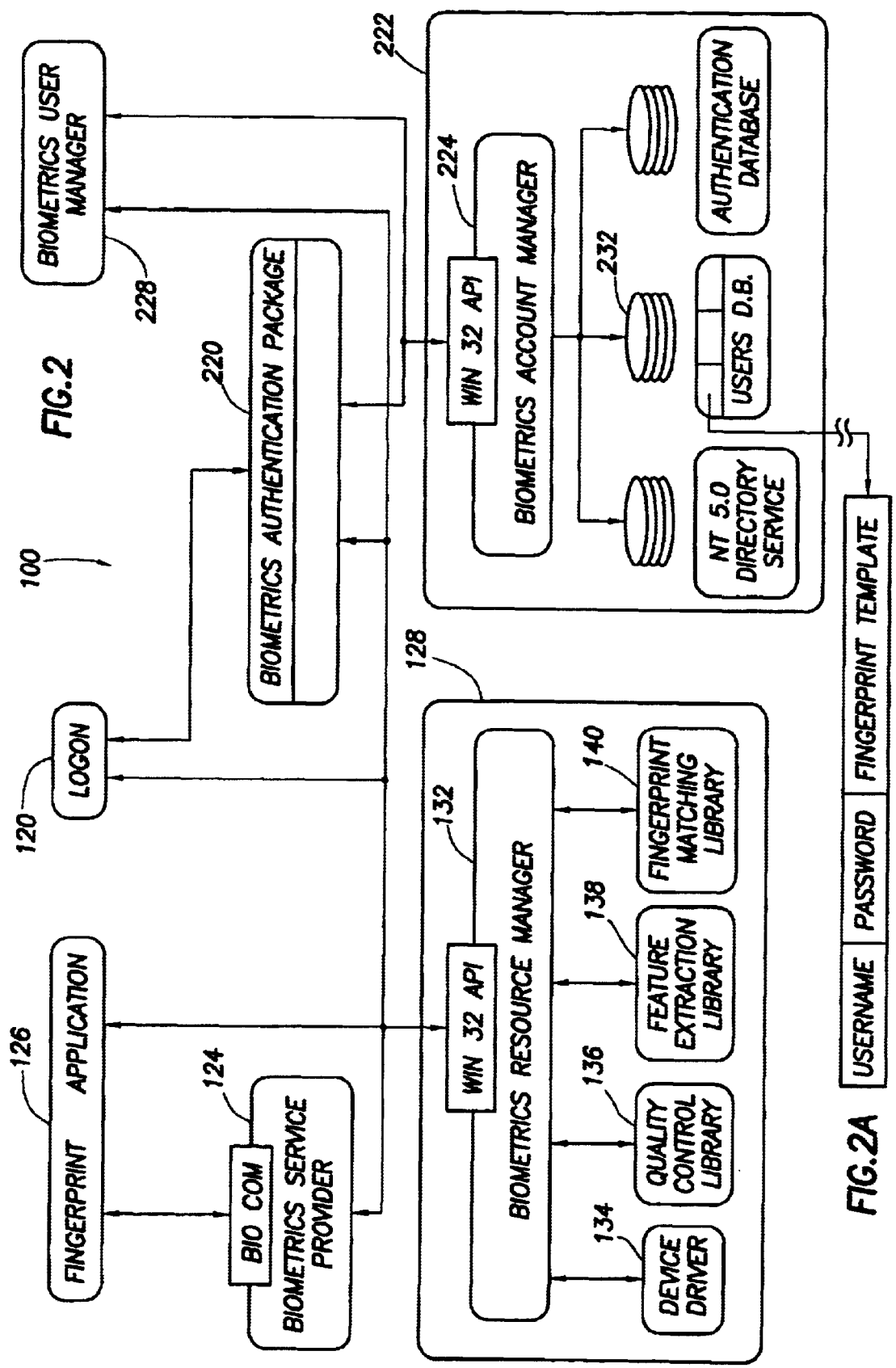
FIG. 2 is a block diagram of the computer network of FIG. 1.

A software architecture is illustrated in FIG. 2 which generally includes the following functional units: log on unit 120, biometrics service provider 124, fingerprint application 126, biometrics resource subsystem 128, biometrics authentication package 220, biometrics account subsystem 222, and biometrics user manager 228. Some of these software modules run on a client 208 while others run on the server 102. In the preferred embodiment, the logon unit 120, 132, 134, 136, 138 and 220 run on the client 208, while the 132, 140, 220, 222 and 228 run on the server 102. The determination as to which modules run on which computer can be varied as desired. Further, although the software architecture shown in FIG. 2 is preferred, other architectures are acceptable as well. All of the components listed above can run on the same machine for local logon authentication.

The blocks shown in FIG. 2 generally represent functional logic units of a software implementation, but also can be implemented in hardware or a combination of hardware and software as will be appreciated by one of ordinary skill in the art. Additionally, the operating system that runs on the client 208 and server 102 computers preferably is the Windows® NT version 4.0 operating system. Other versions of Windows® NT as well as any other suitable operating system such as Windows® 95, Windows® 98, and Windows® CE are also acceptable. Moreover, the architecture is independent of the operating system and therefore is also applicable to OS/2, UNIX, Netware, and Apple environments. The following description of the preferred embodiment, however, assumes the Windows® NT operating system is running on both the client 208 and server 102. A person of ordinary skill will readily be able to adapt the preferred embodiment described herein to other operating systems and system configurations upon reading this disclosure.

The log on unit 120 preferably provides an interface to the biometrics service provider 124, fingerprint application 126 and biometrics resource subsystem 128. The log on unit 120 also includes a user interface to permit the user to log on to the server 102 or the local client 208. In a Windows NT version 4.0 environment, the log on unit 120 includes the Graphical Interface Network Access (GINA) features which is well known to those skilled in the art. The biometrics resource subsystem 128 preferably includes a biometrics resource manager 132, device driver 134, quality control library 136, feature extraction library 138, and fingerprint matching library 140. The biometrics service provider 124 interfaces to the biometrics resource manager 132 which provides low level access and control to the device driver 134, quality control library 136, feature extraction library 138, and fingerprint matching library 140.

The fingerprint application 126 includes any suitable application for using the biometrics features of the computer network 100. By way of function calls to the biometrics service provider 124, the fingerprint application 126 controls the operation of the biometrics features discussed herein. The biometrics service provider 124 provides high level access to the biometrics resource subsystem 128. The fingerprint application 126 can also be configured to provide a direct interface to the biometrics resource manager 132 without the use of, or with reduced involvement from, the biometrics service provider 124. The device driver 134, quality control library 136, feature extraction library 138, and fingerprint matching library 140 provide low level biometrics functions and are discussed below in more detail.

Referring still to FIG. 2, the biometrics service provider 124 provides access between the log on unit 120 and the low level biometrics specific resources (i.e., the device driver 134, quality control library 136, feature extraction library 138, and fingerprint matching library 140). The biometrics resource manager 132 responds to commands received from the log on unit 120, service provider 124, fingerprint application 126, and biometrics authentication package 220 and activates one or more of the biometrics resources 134, 136, 138, 140 to perform the desired function. The device driver 134 provides the logic necessary to operate the fingerprint sensor 218. The quality control library 136 examines raw fingerprint images captured by the fingerprint sensing device 218 to determine if the quality of the image is sufficient before proceeding with the log on process. The feature extraction library 138 uses the captured fingerprint image to extract "features" from which values can be generated that are indicative of the raw fingerprint image. The feature extraction library 138 also generates a template value using known techniques for processing the extracted features. The fingerprint matching library 140 compares the user's template generated by the biometrics resource subsystem 128 during the log on process with templates previously stored in the users database 232 associated with each registered user. The users database 232 in the Windows NT environment is part of the Security Account Manager (SAM) and includes, as shown in the enlarged portion in FIG. 2A, a username (which is optional) a password, and a fingerprint template for each registered user.

The biometrics authentication package 220 interfaces to the log on unit 120, the biometrics service provider 124, the biometrics resource manager 132, the biometrics user manager 228, and the biometrics account subsystem 222. The account subsystem 222 preferably includes a biometrics account manager 224 interfaced to various databases including in particular a users database 232. The biometrics account manager 224 provides low level access to the users database 232 on behalf of the other system modules. The users database preferably resides in the server 102, but can be located on the client 208 or other network components if desired.

The biometrics user manager 228 is activated during an "enrollment" process in which a user is provided a fingerprint identification for logging on to the network 100. During enrollment, a fingerprint template is made of the user's fingerprint and is stored in the users database 232. The enrollment process generally includes capturing an image of the user's fingerprint using the fingerprint sensing device 218 and device driver 134, processing the raw image to extract features from the image using feature extraction library 138, and generating a template based on the extracted features also using feature extraction library 138. The template thus is a value that is generated from a raw fingerprint image and is unique to each person.

In accordance with a preferred embodiment of the invention, the password field in the users database 232 is dynamically changeable, and preferably is changed every time a user logs on to the network. By changing a user's password each time the user logs on, network security is improved because the password does not remain static. Accordingly, even if an unauthorized person was to find out the most recently used password, that person still not would be able to log on because the password changes during each log on. The biometrics account manager 224 provides the ability to read and write to the users database 232 and is capable of dynamically changing a user's password in response to a command from the biometrics authentication package 220.

As noted above, the log on unit 120 provides the user interface to permit a user to log on to the computer network 100. The log on unit 120 may include, for example, an input window on the client display 210. The log on window preferably prompts the user to provide a username, if so configured, and a fingerprint via the fingerprint sensing device 218. The log on window preferably is displayed after the client is initialized or at any other time that the user wishes to log on to computer network 100.

Figure 3:
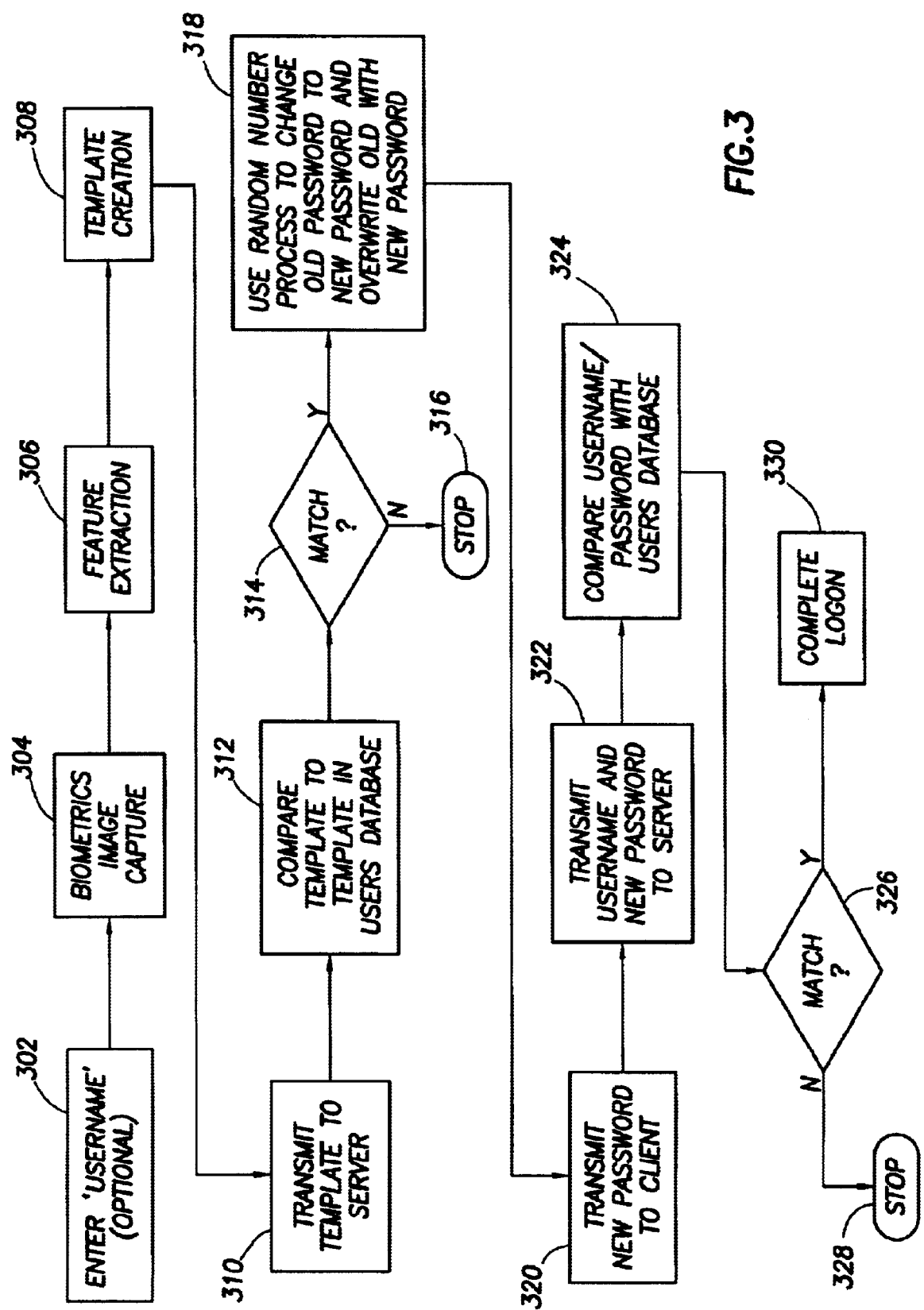
FIG. 3 shows a method for logging on to the computer network while dynamically changing the user's password in accordance with a preferred embodiment of the invention.
Figure 4:
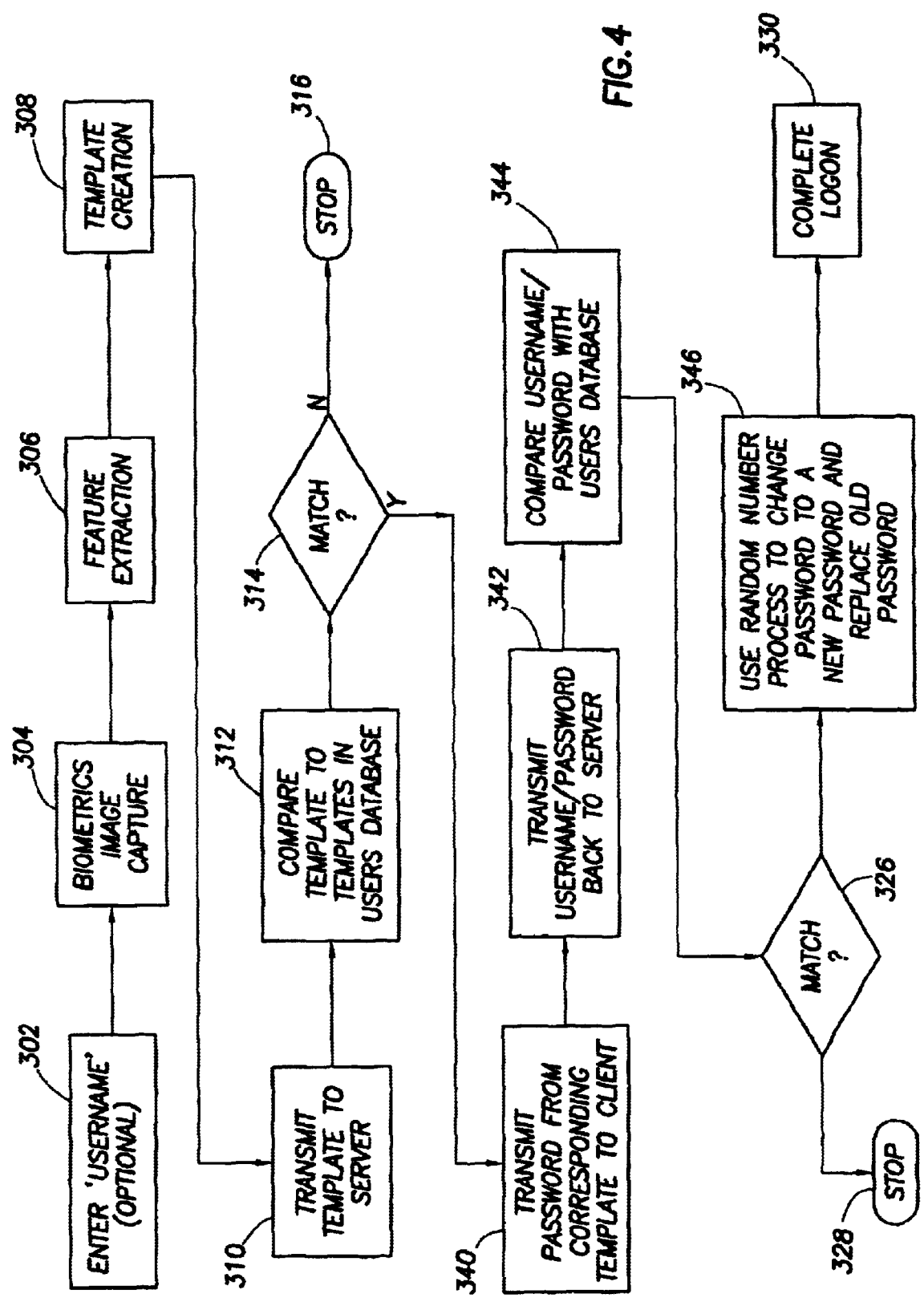
FIG. 4 shows an alternative method for dynamically changing the password.

Referring now to FIGS. 3 and 4, two alternative log on methods will be described in which the user's password is dynamically changed during the log on process. In the method shown in FIG. 3 and discussed with reference to FIG. 2, the user first enters his or her username in step 302 using the log on unit 120. This step is optional, however, and, if omitted, permits a purely biometric log on process in which the user does not have to enter a username via the keyboard 212. Rather, the user would simply log on by placing a finger on the fingerprint sensing device 218. It may be preferred to include step 302, however, to reduce the amount of time the fingerprint matching library resource 140 requires to search for a matching template in the users database 232. If a username is entered, the fingerprint matching library needs only compare the user's template generated during the log on process (step 308) with the template value previously stored with that user's username as best shown in FIG. 2A. If no username entry is required, the fingerprint matching library 140 may have to perform a one-to-many search to compare the user's fingerprint against all templates stored in the user's database 232.

Referring still to FIGS. 2 and 3, in step 304 the biometric sensing device 218 is activated using device driver 134 to capture an image of the user's fingerprint. As noted above, this step can be accomplished using any suitable type of biometric sensing device that can generate a sample indicative of a bodily characteristic that uniquely identifies the user.

In steps 306 and 308, the raw biometric measurement or image is processed to create a template. Features are extracted in step 306 from the image using the fingerprint extraction library 138 and then the template is created from the extracted features in step 308. As noted above, the template is a mathematical representation of the user's fingerprint. The template may comprise a value of any desired length, but preferably is between 50 and 800 bytes in length, and most preferably about 700 bytes. Steps 306 and 308 generally are performed using software provided by the supplier of the biometrics sensing device 218, such as Identicator Technologies Corp.

In step 310, the client computer 208 at which the user has attempted to log on to the server transmits the fingerprint template to the server 102. In step 312 the template received from the client 208 is compared against the template(s) stored in the users database 232. As noted above, the speed of the comparison step 302 is increased when the system is configured to require the user to enter a username in step 302. The comparison is performed using the fingerprint matching library 140 which preferably is provided by the supplier of the biometrics sensing device 218, such as Identicator Technologies Corp. in the case of a fingerprint sensor. In general, the matching algorithm may include any suitable technique such as through the use of neural networks and preferably does not require an exact match for the template to be considered a sufficient match to a template in the users database 232. Any suitable scoring mechanism can be used to determine whether the user's template is within a predetermined range of a database template.

If the template received from the client 208 does not match any of the templates in the users database 232, the log on process is stopped as indicated at step 316. If the biometrics account manager 224 determines that template from the client 208 matches the template associated with the user's username, or any template if the username entry step 302 is omitted, control passes to step 318 in which the user's password is retrieved from the users database 232 by biometrics account manager 224. The biometrics account manager 224 then changes the current password to a new password using any suitable random or pseudo-random process.

Most random number generating processes require a "seed" value as an input value into the process to calculate the random number. The fingerprint template value, current password or any other value can be used as the seed in the random number process in step 318 to generate a new password. After the new password is randomly generated, the biometrics account manager 224 replaces the old password with the new password in the users database 232.

Then, in step 320, the new randomly generated password is transmitted to the client 208 which, in turn, transmits the username (if provided) and the new password back to the server 102 in step 322. Step 322 is required in various operating system environments such as Windows® NT version 4.0, but can be omitted in other environments that do not require a username and password to be provided directly from the client to the server. In step 324, the biometrics account manager 224 compares the username and password received from the client 208 to the list of usernames and passwords stored in the users database 232. If a match is found, which should be the case unless something has gone wrong during the log on process, the log on process is completed in step 330 which comprises any one or more desired actions. For example, step 330 may include associating various network resource privileges with the user. These privileges, for example, may define databases and programs the user can and cannot access and files that the user can and cannot change. If no match is found in step 326, the log on process stops in step 328.

In steps 316 and 328 in which an error has occurred during the log on process causing the log on process to stop, if desired, computer network 100 can be programmed to randomly change the user's password anyway to further increase network security. If implemented, the password change preferably is performed similarly to step 318 and the current password is replaced with a new password randomly generated based on any suitable seed value such as the current (about to be old) password or the fingerprint template value. Further, computer network 100 can be programmed to dynamically and automatically change the password only after a preprogrammed number of failed log on attempts have been made. The biometrics account manager 224 preferably keeps track of the number of failed log on attempts and if that number equals the preprogrammed number automatically change the password. The preprogrammed number might be two, three, or any other desired number.

An alternative embodiment is shown in FIG. 4 for dynamically changing the user's password during log on using a biometrics sensing device. Steps 302, 304, 306, 308, 310, 312, 314, and 316 are substantially the same as the corresponding steps in FIG. 3. Rather than dynamically changing the password immediately after detecting a match in step 314, the current password is transmitted to the client 208 in step 340. The log on process continues in step 342 in which the username (if provided in optional step 302) and password (which has not yet been changed) are transmitted back to the server 102 for comparison by the biometrics account manager 224 in step 344. If a match is found in step 326, the password then is changed using a random or pseudo-random process in step 346 and the biometrics account manager overwrites the old password in the users database 232 with the newly generated password. Finally, the log on process completes in step 330. In this embodiment, the old password is used to log on the user, but is dynamically and randomly changed for the next attempted log on by the same user. Also, as with the embodiment of FIG. 3, the biometrics account manager 224 may change the password even upon the occurrence of a failed log on attempt in steps 316 and 328.

The embodiments shown in FIGS. 3 and 4 illustrate several ways to dynamically change a password each time a user logs on to the computer network. The password preferably is changed using a random, pseudo-random or any other suitable process that would be difficult for an unauthorized individual to know or determine.

In another embodiment of the invention, the server 102 can be programmed to automatically change any desired set of passwords in the users database 232 on predefined dates or after predefined periods of time. For example, all passwords can be randomly changed once per month. This procedure generally further increases network security. The random process used to change the passwords preferably uses a random, pseudo-random or other suitable process. The seed for the random number generator used to generate the new passwords preferably is the current password or other suitable value.

In the embodiments discussed above, the user need not remember and enter a password to log on to the network. Thus, passwords can be longer than passwords implemented in conventional systems. Further, if desired, each user can be registered to require biometric log on, or not. Thus, in general network 100 can be implemented to permit some users to log on by entering a username and password while other users use the biometrics feature to log on.

The above discussion is meant to be illustrative of the principles of the present invention. However, numerous variations and modifications will become apparent to those skilled in the art once the above disclosure is fully appreciated. It is intended that the following claims be interpreted to embrace all such variations and modifications.

What is claimed is:

1. A method for dynamically changing a user's password in a computer network, comprising:
   (a) capturing a biometrics sample associated with a bodily characteristic of a user;
   (b) generating a template value using said captured biometrics sample;
   (c) comparing said template value to a template value associated with a current user password stored in a database;
   (d) automatically changing said current user password to a new password if a match is found in step (c), and
   (e) storing the new password in a user database.

2. The method of claim 1 wherein step (d) includes changing said current user password by generating a random number.

3. The method of claim 2 wherein generating a random number includes using a seed value to generate the random number.

4. The method of claim 3 wherein the seed value includes the current user password.

5. The method of claim 1 further including logging on to the computer network using the new password from step (d).

6. The method of claim 1 further including logging on to the computer network using the current user password before step (d).

7. A method for dynamically changing a user's password in a computer network, comprising:
   (a) capturing a biometrics sample associated with a bodily characteristic of a user;
   (b) generating a template value using said captured biometrics sample;
   (c) comparing said template value to a template value associated with a current user password stored in a database;
   (d) changing said current user password to a new password if a match is found in step (c); and
   (e) storing the new password in a user database,
wherein step (d) includes changing said current user password by generating a random number,
wherein generating a random number includes using a seed value to generate the random number, and
wherein the seed value includes said template value.

8. A server computer system, comprising:
   a users database containing for each registered user a password and a biometrics template representative of bodily characteristic of the registered user; and
   a biometrics account manager that changes the password in the users database associated with a particular registered user after each time that user logs on to the server computer system,
   wherein said biometrics account manager determines a random number and uses the random number to change the password associated with the particular registered user to a new password, and wherein the biometrics account manager stores the new password in the users database.

9. The server computer system of claim 8, wherein the biometrics account manager is further configured to periodically change all the passwords in the users database.

10. A server computer system, including:
   a users database containing for each registered user a password and a biometrics template representative of bodily characteristic of the registered user;
   a means for dynamically changing a password stored in said users database associated with a user who attempts to log on to the server computer system; and
   a means for automatically changing a set of passwords using a random or pseudo-random process.

* * * * *